UNITED STATES PATENT OFFICE.

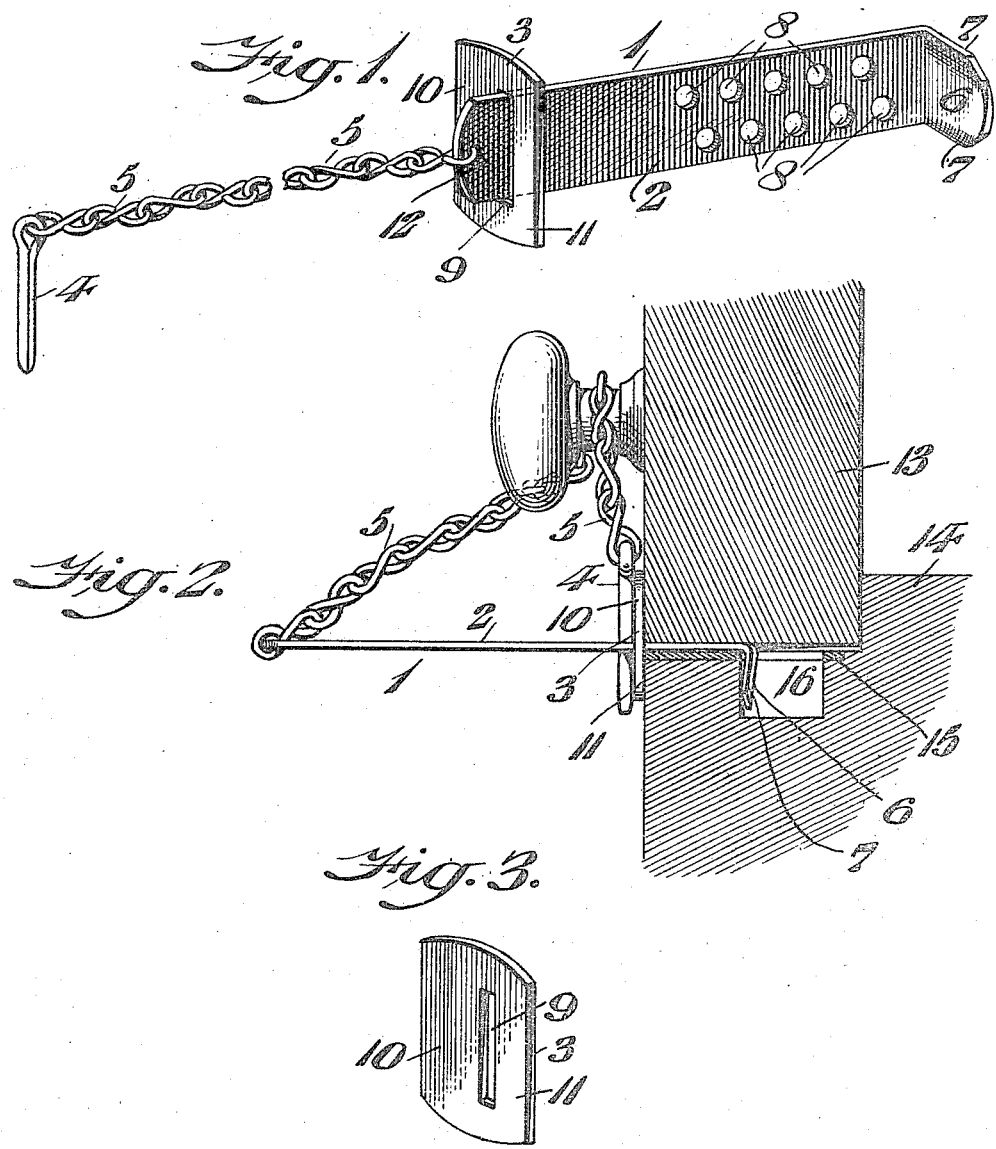

JOHN B. HALL, OF PHILADELPHIA, PENNSYLVANIA.

FASTENING DEVICE FOR DOORS.

1,234,158.

Specification of Letters Patent. Patented July 24, 1917.

Application filed June 10, 1916. Serial No. 102,846.

*To all whom it may concern:*

Be it known that I, JOHN B. HALL, a citizen of the United States, residing in the city and county of Philadelphia, State of Pennsylvania, have invented a new and useful Fastening Device for Doors, of which the following is a specification.

My present invention consists of a novel construction and arrangement of a fastening device which is especially adapted to be employed for securing doors, windows, or the like, in locked position, and is adapted to be employed in all cases wherein such parts are to be secured in their locked position, irrespective of whether or not they are provided with additional locking devices.

In accordance with my present invention, I have devised a simplified and compact construction comprising a body portion preferably made of sheet metal having one end deflected to form a hook and having slidably mounted upon the body portion, a plate or block also preferably formed from sheet metal. The body portion is provided with a series of apertures adapted to receive a fastening device and the parts are assembled in such a manner that the entire device forms a concrete, unitary structure.

It further consists of novel means for preventing the plate or block from becoming detached from the bolt or bar on which it is carried.

Other novel features of construction and advantage will hereinafter more clearly appear in the detailed description of my invention.

For the purpose of illustrating my invention, I have shown in the accompanying drawings one form thereof which is at present preferred by me, since the same will give in practice satisfactory and reliable results, although it is to be understood that the various instrumentalities of which my invention consists can be variously arranged and organized and that my invention is not limited to the precise arrangement and organization of these instrumentalities as herein shown and described.

Figure 1 represents a perspective view of a fastening device for doors embodying my invention.

Fig. 2 represents a side elevation thereof, showing my novel fastening device in assembled condition with respect to the door jamb.

Fig. 3 represents a perspective view of the plate seen in Figs. 1 and 2, in detached position.

Similar numerals of reference indicate corresponding parts in the figures.

Referring to the drawings:—

1 designates a fastening device embodying my invention, the same consisting of four parts, namely, the bar or bolt 2, a plate or block 3 adjustable thereon, a fastening device 4, and a cable 5. The bar or bolt 2 consists of a strip of sheet metal of uniform diameter throughout and having its forward end deflected at substantially right angles in order to form a hook 6, the top and bottom of which are inwardly curved or deflected, as at 7. The body portion of the bar 2 is provided with the desired number of apertures 8, which, in the present instance, are formed in a plurality of rows so that these apertures are in staggered relation with respect to each other. The body portion 2 is constructed in such a manner that the sides thereof preferably form plane surfaces, and the plate 3 is provided with a slot 9, through which the bar 2 extends. This plate 3 may be of any desired width, but in the present instance, I have illustrated the same as having a portion 10 on one side of the slot 9 as being of greater width than the portion 11 on the other side of the slot 9.

The fastening device 4 preferably consists of a slot pin and the cable 5 preferably consists of a chain, one end of which is connected with a cotter pin and the other end of which is secured to the aperture 12 at the rear end of the bar 2. 13 designates the door and 14 designates the jamb of the door which is provided with the apertured keeper 15 of the usual construction, the jamb of the door being recessed, as at 16, in the usual manner.

In the operation, the door is opened and the hook 6 is inserted into the aperture of the keeper 15. The door is then closed and the locking plate 3 is moved along the body portion of the bar 2 until it comes into close contact with the outer face of the door and the door jamb. The cotter pin 4 is then inserted into the aperture 8 which is in closest proximity to the outer face of the adjustable locking plate.

If the narrow portion 11 is not of sufficient width to properly engage the door jamb, the cable 5 can be disconnected and the locking plate turned so that the portion 10 of greater width will abut against the door jamb.

The parts 2 and 3 are preferably made of steel or other material of high tensility in order that the requisite strength may be obtained. These parts, as will be apparent, may be readily formed from sheet metal at a minimum expense.

It will be seen that the hook 6 is deflected in such a manner that the plate 3 cannot be accidentally removed from the locking bar, and it is prevented from being removed from the other end of the bar owing to the manner in which the chain is connected therewith. The plate 3 can move on to the hook 6 a sufficient distance to bring it parallel with the bar 2 so that the device can be mailed in an envelop in a substantially flat condition.

The plate 3 forms an adjustable locking member and as the apertures 8 are arranged in the same relation, any desired range of adjustment can be obtained.

It is desirable in some cases to have the cable of sufficient length so that it can be wrapped around the door knob.

It will be apparent to those skilled in this art that in some cases, the fastening device may be dispensed with and the cable wound around the door knob or other fixed point in order to fasten the parts together, and in some cases, the plate 3 can also be dispensed with, as is apparent, and such construction is within the spirit and scope of my invention.

It will now be apparent that I have devised a novel and useful fastening device for doors, which embodies the features of advantage enumerated as desirable in the statement of the invention and the above description, and while I have, in the present instance, shown and described a preferred embodiment thereof which will give in practice satisfactory and reliable results, it is to be understood that the same is susceptible of modification in various particulars without departing from the spirit or scope of the invention or sacrificing any of its advantages.

Having thus described my invention, what I claim as new and desire to secure by Letters Patent, is:—

A device of the character stated, consisting of a body portion of sheet metal of uniform thickness having one end deflected at substantially right angles to form a hook and provided with apertures in proximity to the hook, an apertured plate slidably mounted on the body portion, said hook permitting said plate to slide over it sufficiently to bring the plate parallel with said body portion and having its sides deflected to prevent the removal of said plate over said hook, a fastening device adapted to be inserted in an aperture, and a cable connecting the fastening device with the body portion and preventing the removal of the plate from the rear end of the body portion.

JOHN B. HALL.

Witnesses:
H. S. FAIRBANKS,
C. D. McVAY.